(12) United States Patent
Shiraishi et al.

(10) Patent No.: US 11,481,910 B2
(45) Date of Patent: Oct. 25, 2022

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventors: Yuki Shiraishi, Tokyo (JP); Tomokazu Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 352 days.

(21) Appl. No.: 16/777,047

(22) Filed: Jan. 30, 2020

(65) Prior Publication Data
US 2020/0273187 A1   Aug. 27, 2020

(30) Foreign Application Priority Data
Feb. 21, 2019  (JP) .............................. JP2019-029156

(51) Int. Cl.
| G06T 7/33 | (2017.01) |
| G06T 7/246 | (2017.01) |
| G06T 7/579 | (2017.01) |
| H04N 19/159 | (2014.01) |

(52) U.S. Cl.
CPC .............. *G06T 7/344* (2017.01); *G06T 7/251* (2017.01); *G06T 7/579* (2017.01); *H04N 19/159* (2014.11)

(58) Field of Classification Search
CPC ......... G06T 7/344; G06T 7/251; G06T 7/579; G06T 2207/30224; G06T 2207/30221; G06T 2207/30196; G06T 7/215; H04N 19/159; H04N 19/23; H04N 19/17; H04N 19/172
See application file for complete search history.

(56) References Cited

U.S. PATENT DOCUMENTS

| 5,440,720 A | * | 8/1995 | Baisuck ................. G06F 30/398 703/2 |
| 5,764,786 A | * | 6/1998 | Kuwashima ............... G06T 7/20 348/E5.042 |
| 6,363,173 B1 | * | 3/2002 | Stentz .................... G06V 20/64 382/153 |
| 9,602,842 B2 | | 3/2017 | Matsui et al. |
| 10,210,382 B2 | * | 2/2019 | Shotton ................ G06V 40/103 |

(Continued)

FOREIGN PATENT DOCUMENTS

WO    WO-2018116305 A1 * 6/2018 ............. G01B 11/00

OTHER PUBLICATIONS

Collet, Alvaro, et al., "High-Quality Streamable Free-Viewpoint Video," ACM Trans. Graphics (SIGGRAPH), 34(4), 2015, retrieved May 30, 2018, internet <URL : http://hhoppe.com/fvv.pdf>.

*Primary Examiner* — Charles T Shedrick
(74) *Attorney, Agent, or Firm* — Carter, DeLuca & Farrell LLP

(57) ABSTRACT

Highly accurate shape registration processing is performed. In the image processing apparatus, data, which correspond to N frames (N is an integer not less than 2), in units of frames including a plurality of three-dimensional models per frame is acquired. Then, shape registration processing is performed for the acquired three-dimensional models corresponding to the N frames by using information indicating a correspondence relationship of the three-dimensional models between frames of the N frames.

13 Claims, 15 Drawing Sheets

(56) References Cited

U.S. PATENT DOCUMENTS

| | | | | |
|---|---|---|---|---|
| 11,004,248 B2* | 5/2021 | Cotter | ............... | G06T 7/292 |
| 11,253,217 B2* | 2/2022 | Grass | ............... | A61B 6/507 |
| 2008/0031512 A1* | 2/2008 | Mundermann | ........ | G06V 40/23 |
| | | | | 382/154 |
| 2013/0250050 A1* | 9/2013 | Kanaujia | ............ | H04N 7/181 |
| | | | | 348/42 |
| 2014/0286529 A1* | 9/2014 | Sprenger | ............ | G06V 20/69 |
| | | | | 382/103 |
| 2017/0296913 A1* | 10/2017 | Numaguchi | ............ | A63F 13/65 |
| 2018/0374221 A1* | 12/2018 | Komoto | ............... | G06T 7/00 |
| 2020/0242837 A1 | 7/2020 | Sato | | |

\* cited by examiner

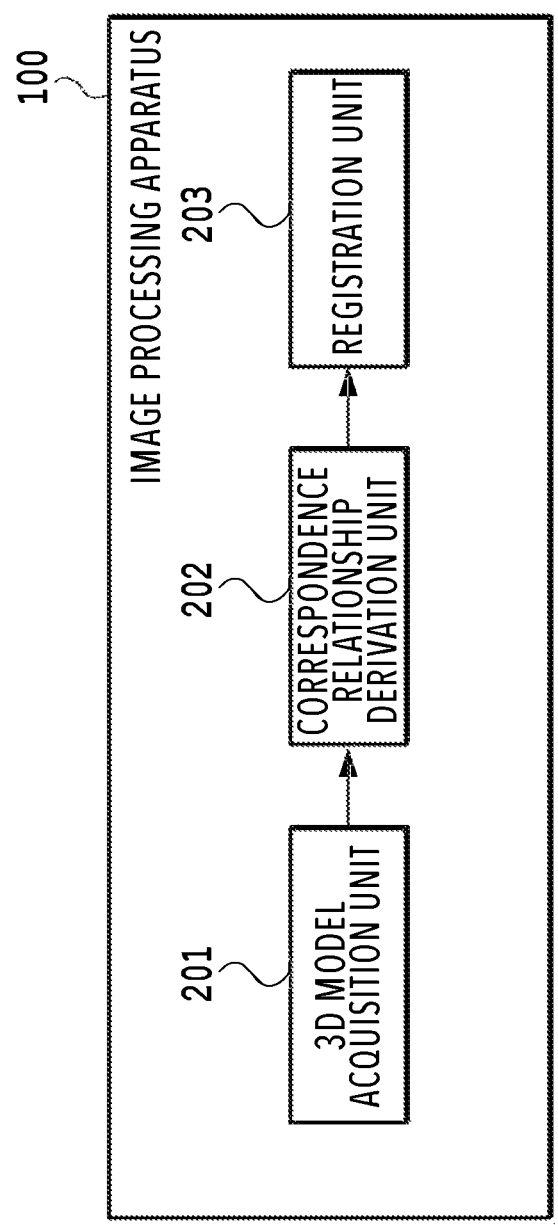

| | | |
|---|---|---|
| TRIANGLE | T0 | V0, V1, V2 |
| | T1 | V1, V3, V2 |
| | T2 | V0, V2, V4 |
| COORDINATES | V0 | (x0, y0, z0) |
| | V1 | (x1, y1, z1) |
| | V2 | (x2, y2, z2) |
| | V3 | (x3, y3, z3) |
| | V4 | (x4, y4, z4) |

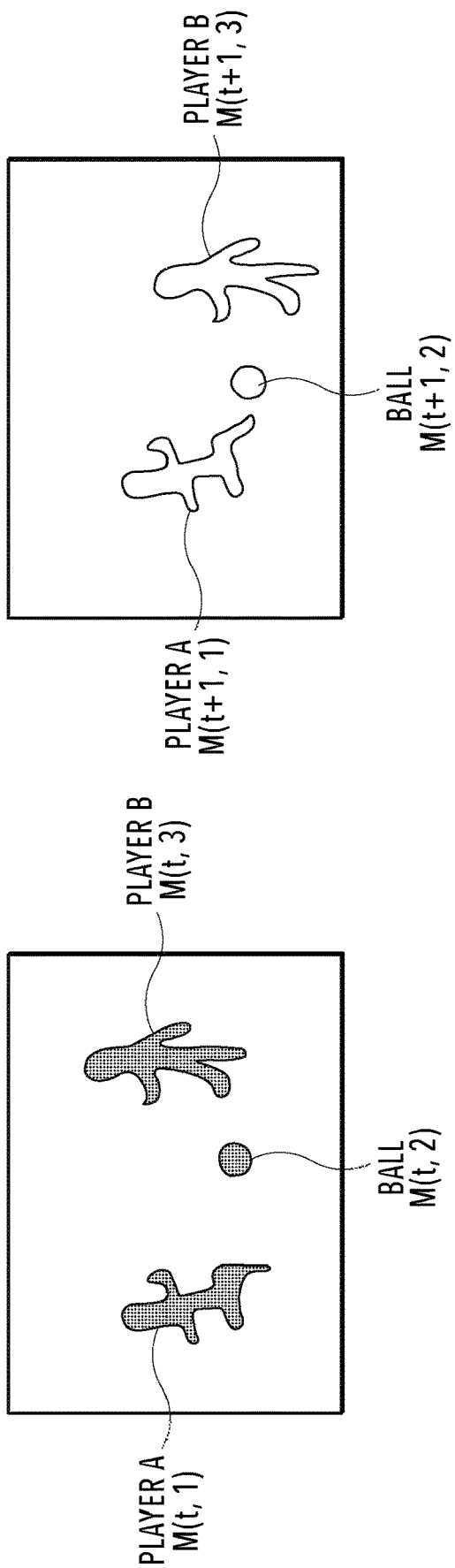
FIG.5A
FIG.5B
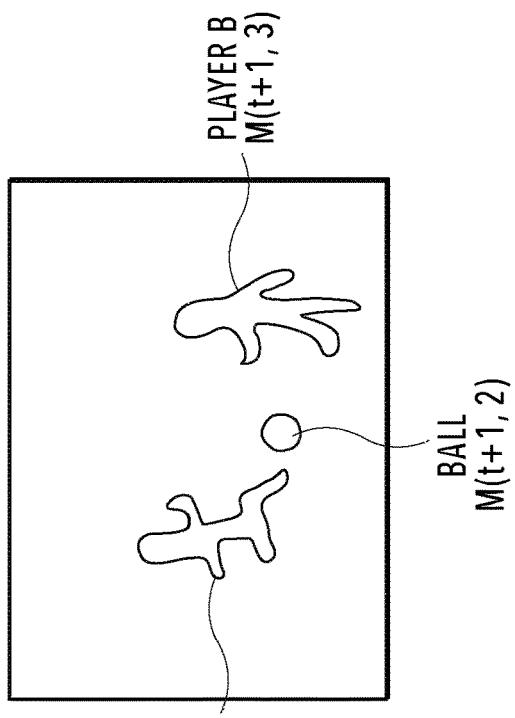
FIG.5C

IMAGE PROCESSING APPARATUS, IMAGE PROCESSING METHOD AND STORAGE MEDIUM

BACKGROUND

Field

The present disclosure relates to a shape registration technique of three-dimensional model.

Description of the Related Art

Conventionally, as regards the technique to generate a virtual viewpoint image from video images captured by a plurality of cameras, a technique has been proposed that implements a compact data stream by performing inter-frame predictive encoding (time difference encoding) at the time of transmission of three-dimensional model of a person and an object in an image capturing scene. Specifically, there is Alvaro Collet and other eight persons, "High-Quality Steamable Free-Viewpoint Video", "online", "searched for, May 30, 2018", internet <URL: http://hhoppe.com/fvv.pdf>.

In a case where a game of a sport, such as soccer and basketball, is taken as an image capturing scene, a situation occurs in which a plurality of players and a ball freely move within a capturing target space. In a three-dimensional model across a plurality of frames generated from captured images (moving image) of the sports scene such as this, a correspondence relationship between frames of each individual three-dimensional model included in each frame is not determined yet. In a case where shape registration processing of three-dimensional model whose correspondence relationship between frames is not determined yet as described above is performed, there is a possibility that it is no longer possible to perform shape registration with a high accuracy.

Consequently, an object of the present disclosure is to perform shape registration processing with a high accuracy.

SUMMARY

The image processing apparatus according to the present disclosure comprises: an acquisition unit configured to acquire data, which correspond to N frames (N is an integer not less than 2), in units of frames including a plurality of three-dimensional models; and a processing unit configured to perform shape registration processing for the three-dimensional models, which correspond to the N frames, acquired by the acquisition unit, the shape registration processing being performed, based on information indicating a correspondence relationship of the three-dimensional models between frames of the N frames, for the three-dimensional models caused to correspond to each other between the frames.

Further features of the present disclosure will become apparent from the following description of exemplary embodiments with reference to the attached drawings.

BRIEF DESCRIPTION OF THE DRAWINGS

FIG. 2 is a function block diagram showing a software configuration relating shape registration processing of an image processing apparatus according to a first embodiment;

FIG. 5A to FIG. 5C are diagrams explaining derivation of a correspondence relationship between frames;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

In the present embodiment, an aspect is explained in which a correspondence relationship between frames is found for three-dimensional models corresponding to a plurality of frames that are input and shape registration of the three-dimensional models is performed based on the obtained correspondence relationship. Further, in the present specification, it is assumed that an "object" refers to a moving object (foreground object) that moves within a target three-dimensional space, such as a person and a ball, among a variety of objects existing in an image capturing scene. Then, in the present specification, it is assumed that a "three-dimensional model" means data (three-dimensional shape data) representing a three-dimensional shape of such a moving object and there is a case where the "three-dimensional model" is represented as the 3D model.

(Hardware Configuration of Image Processing Apparatus)

Figure 1:
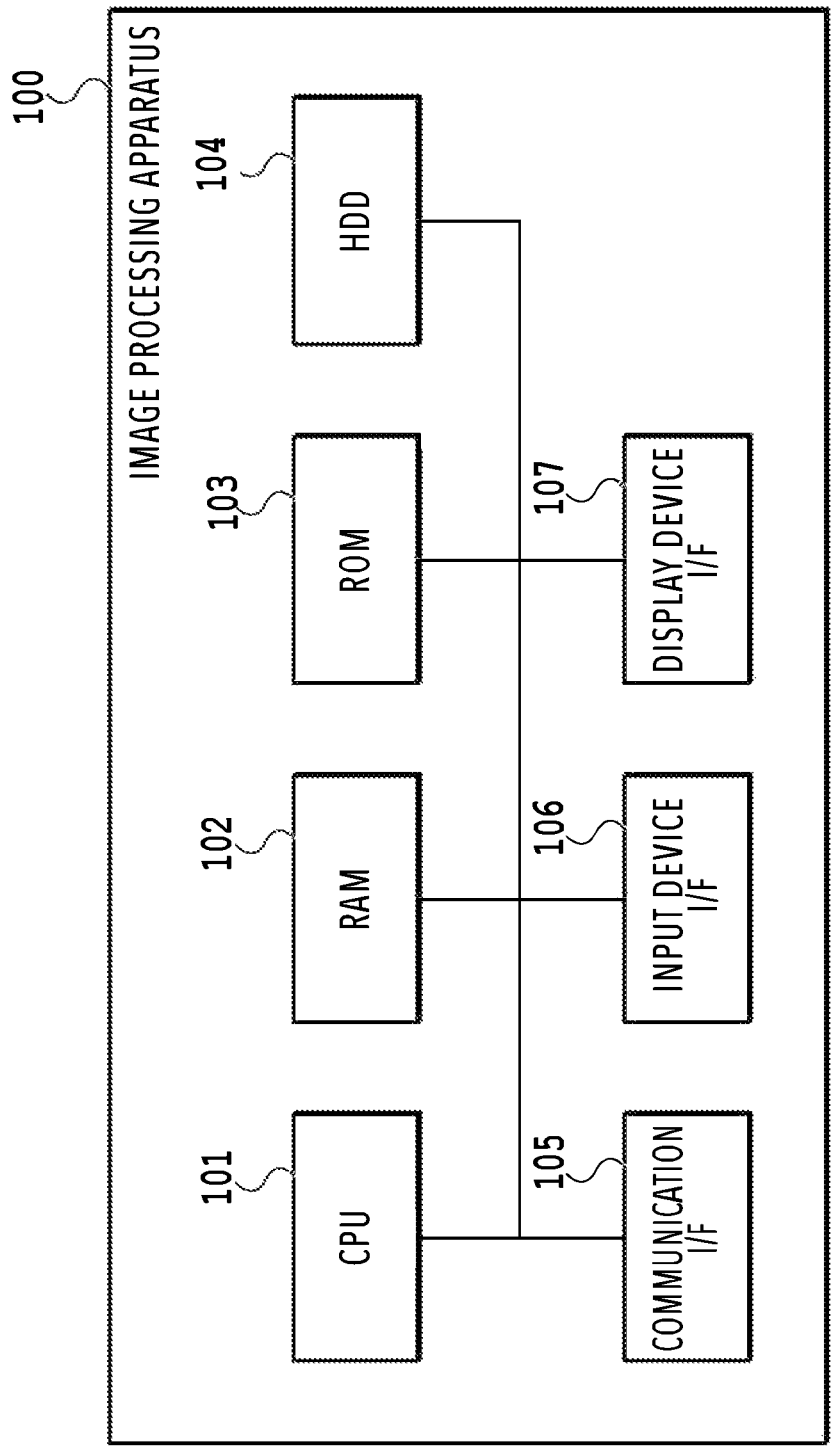
FIG. 1 is a diagram showing an example of a hardware configuration of an image processing apparatus that performs shape registration of three-dimensional model.

FIG. 1 is a diagram showing an example of a hardware configuration of an image processing apparatus that performs shape registration of a three-dimensional model according to the present embodiment. An image processing apparatus 100 has a CPU 101, a RAM 102, a ROM 103, an HDD 104, a communication I/F 105, an input device I/F 106, and an output device I/F 107. The CPU 101 is a processor that centralizedly controls each unit of the image processing apparatus 100 by executing various programs stored in the ROM 103 by using the RAM 102 as a work memory. The function of each unit shown in FIG. 2, to be described later, is implemented by the CPU 101 executing the various programs. It may also be possible for the image processing apparatus 100 to have one piece or a plurality of pieces of dedicated hardware different from the CPU 101 or a GPU and for the GPU or the dedicated hardware to perform at least part of the processing by the CPU 101. As an example of the dedicated hardware, there are an ASIC (Application Specific Integrated Circuit), a DSP (Digital Signal Processor), and the like. The RAM 102 temporarily stores programs read from the ROM 103, calculation results, data supplied from the outside via the communication I/F 105, and the like. The ROM 103 stores programs that do not need to be changed, such as the OS, and data. The HDD 104 is a large-capacity storage device that stores various kinds of data of three-dimensional models that are input from the external information processing apparatus and may be, for example, an SSD. The communication I/F 105 is an interface for receiving various kinds of data of three-dimensional models and the like. The input device I/F 106 is an interface that connects a keyboard and a mouse for a user to perform the input operation. The output device I/F 107 is an interface that connects to a display device, such as a liquid crystal display, which displays information necessary for a user.

(Software Configuration of Image Processing Apparatus)

FIG. 2 is a function block diagram showing a software configuration relating to shape registration processing of the image processing apparatus 100 according to the present embodiment. The image processing apparatus 100 of the present embodiment has a 3D model acquisition unit 201, a correspondence relationship derivation unit 202, and a registration unit 203. In the following, the outline of each unit is explained.

The 3D model acquisition unit 201 acquires, in units of frames, data of three-dimensional models generated in an external information processing apparatus (not shown schematically), which correspond to a plurality of frames. For example, a scene in which a game, such as soccer, is played in a stadium is synchronously captured in a moving image mode by using a plurality of cameras and in the external information processing apparatus, for each frame, the shapes of a plurality of objects, such as a player and a ball, are estimated. Then, it is assumed that the data of the three-dimensional models, which correspond to a plurality of frames, thus obtained are input. It may also be possible for the 3D model acquisition unit 201 to acquire image data acquired based on image capturing by a plurality of cameras and generate three-dimensional models based on the image data. Further, it is possible to apply the present embodiment to, for example, a concert, a theatrical performance, and the like other than a sport.

As regards the technique to estimate the three-dimensional shape of an object from the outline thereof for the object included in a plurality of images obtained by synchronous image capturing by a plurality of cameras (image group of the same frame), it may be possible to apply a publicly known technique, such as a visual volume intersection method. Further, as the representation format of a three-dimensional model, the point cloud format, the voxel format, the mesh format and the like exist. The three-dimensional model handled in the present embodiment may be in any representation format, but in the following, it is assumed that explanation is given by taking a case of the mesh format as an example. Further, it is premised that a plurality of objects is captured in each frame and the number of objects does not change and remains constant between frames. However, one three-dimensional model is not necessarily generated for one object. There is a case where one three-dimensional model is generated for a plurality of objects existing at near positions. As an example thereof, mention is made of a case where players contact each other.

Figures 3A, 3B:
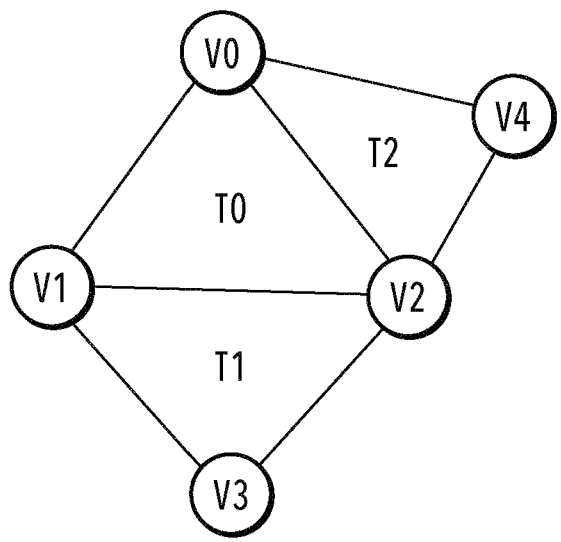
FIG. 3A and FIG. 3B are diagrams showing examples of vertex coordinate information and mesh connectivity information.

In a case where the three-dimensional shape of an object is represented in the mesh format, the object shape is defined by three-dimensional coordinates (x, y, z) of each vertex and connectivity information that connects the vertexes, and therefore, it is necessary to determine a point (origin) that is a reference on a target three-dimensional space. In the present embodiment, the center position in the field of the stadium is defined as the origin (0, 0, 0). Then, it is assumed that the vertex coordinates (x, y, z) of each mesh representing the three-dimensional shape of each object and the connectivity information between the vertexes are input as the three-dimensional model. FIG. 3 shows examples of vertex coordinate information and mesh connectivity information in a case where the surface shape of an object is represented by triangular meshes. In FIG. 3A, T0 to T2 represent triangular meshes and V0 to V4 represent vertexes, respectively. The vertexes of the mesh T0 are V0, V1, and V2, the vertexes of the mesh T1 are V1, V2, and V3, and the vertexes of the mesh T2 are V0, V2, and V4. In this case, the vertexes V1 and V2 are common to the mesh T0 and the mesh T1, and therefore, it is known that both the meshes are adjacent to each other. Similarly, the vertexes V0 and the V2 are common to the mesh T2 and the mesh T0, and therefore, it is known that both the meshes are adjacent to each other. By the information such as this, which specifies the connection relationship between the vertexes, it is possible to grasp how each mesh is configured and specify the surface shape of the object. As a specific data configuration, it is sufficient to have the vertexes V configuring each triangular mesh T and the three-dimensional coordinates (x, y, z) of each vertex V in, for example, a list format as a table shown in FIG. 3B. Of course, a data configuration other than a list format may be accepted.

The correspondence relationship derivation unit 202 derives a correspondence relationship between frames by performing object tracking processing for the three-dimensional models corresponding to an input plurality of frames. Then, based on the derivation results, information (hereinafter, called "correspondence relationship information") capable of grasping that the three-dimensional model represents the same object between the frame of interest and the next frame among the input plurality of frames is generated. The correspondence relationship information only needs to be information by which it is possible to know, for example, from which a player who is moving within the field comes and to which the player moves in the previous and subsequent frames. For object tracking, for example, it may be possible to use a publicly known method, such as template matching and feature point matching. By object tracking, to which three-dimensional model of the plurality of objects existing in the subsequent frame, each three-dimensional model of the plurality of objects existing in the previous frame corresponds is specified and the correspondence relationship information is generated based on the specification results. The generated correspondence relationship information between frames of each three-dimensional model is used in shape registration processing in the registration unit 203.

The registration unit 203 performs shape registration based on the correspondence relationship information on the three-dimensional model between the frame of interest and the frame that advances therefrom in terms of time. Here, the shape registration means matching the corresponding positions of the three-dimensional models between frames and has the same meaning as "nonlinear registration". As specific processing contents in the present embodiment, processing to find an amount of movement for moving the coordinate position of the vertex of the mesh representing the shape of the three-dimensional model of interest so that the shape becomes close to the shape of the three-dimensional model corresponding to the three-dimensional model of interest is performed. The amount of movement is a vector quantity including two components, that is, direction and magnitude. By moving the vertex coordinate position of the mesh representing the shape of the three-dimensional model of interest in accordance with the amount of movement obtained by the shape registration, it is possible to generate three-dimensional shape data equivalent to the three-dimensional model corresponding to the three-dimensional model of interest. That is, in a case where the three-dimensional model in the reference frame has the vertex coordinate information and the mesh connectivity information, by using the amount of movement of each vertex, it is made possible to reconfigure the three-dimensional model in the next frame corresponding thereto. This means that it is no longer necessary to have the vertex coordinate information and the mesh connectivity information necessary to specify the three-dimensional shape of the object in all the frames and as a result, it is possible to reduce the amount of data. For shape registration, it may be possible to use a publicly known technique, for example, such as the ICP (Iterative Closest Point) algorithm. The ICP algorithm is a method in which a cost function is defined by the square sum of the amount of movement between each point representing a three-dimensional shape and the corresponding point, which is the movement destination, and shape registration is performed so that the cost function is minimized.

In the present embodiment, the correspondence relationship derivation processing between frames of the three-dimensional model is performed in the correspondence relationship derivation unit 202 provided within the image processing apparatus 100, but the present embodiment is not limited to this. For example, it may also be possible to perform the correspondence relationship derivation processing in the external apparatus and input the correspondence relationship information, which is the processing results, to the image processing apparatus 100 and then for the registration unit 203 to use the correspondence relationship information. Further, the data of the three-dimensional models across a plurality of frames are acquired from the external apparatus and then the correspondence relationship is derived, but it may also be possible to acquire image data of a plurality of viewpoints and generate a three-dimensional model within the self apparatus and then derive the correspondence relationship therebetween.

(Flow of Image Processing)

Figure 4:
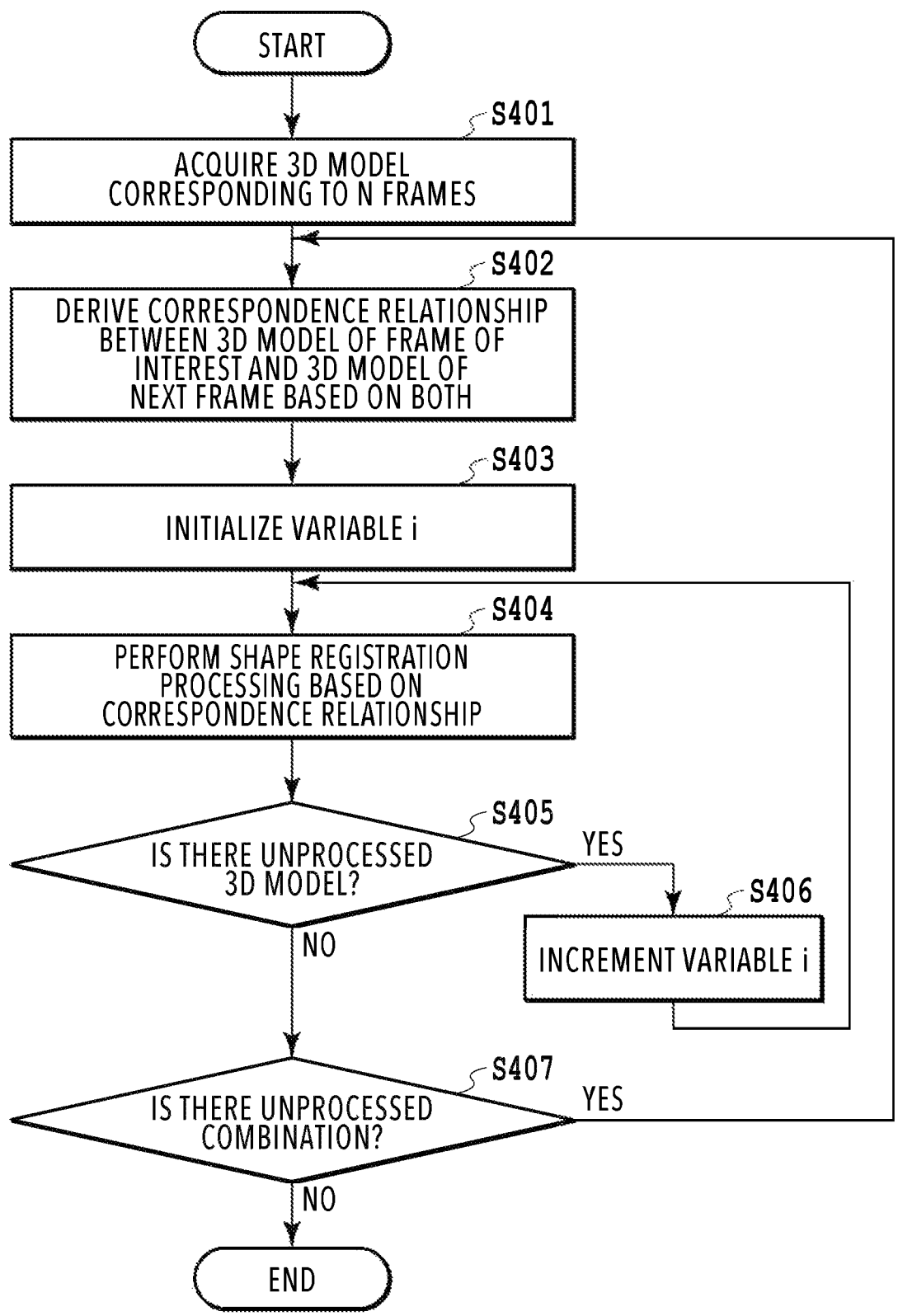
FIG. 4 is a flowchart showing a flow of processing in the image processing apparatus according to the first embodiment.

FIG. 4 is a flowchart showing a flow of processing in the image processing apparatus 100 according to the present embodiment. This flowchart is implemented by the CPU 101 reading the control program stored in the ROM 103 onto the RAM 102 and executing the control program. In explanation below, "S" means a step.

At S401, the 3D model acquisition unit 201 acquires data of three-dimensional models corresponding to N frames (N is an integer not less than 2), which are the generation target of a virtual viewpoint video image, from the external apparatus or the HDD 104. For example, in a case where a virtual viewpoint video image is generated by taking a moving image corresponding to ten seconds as a target, which is captured at 60 fps, three-dimensional models corresponding to 600 frames are input. As described previously, in each frame, a plurality of three-dimensional models corresponding to two or more objects is included. The data of the three-dimensional models, which correspond to the input N frames, are stored in the RAM 202.

At S402, the correspondence relationship derivation unit 202 determines two frames (the frame of interest and the next frame that advances therefrom in terms of time) that are the processing target and derives the correspondence relationship of the three-dimensional models between both the frames. Specifically, among the data of the three-dimensional models, which correspond to the input N frames, the data of the three-dimensional models corresponding to the two frames determined to be the processing target are read from the RAM 102 and the object tracking processing is performed and then the correspondence relationship information between both the frames is generated. For example, in a case where the three-dimensional models corresponding to 600 frames are input at S401, on a condition that the correspondence relationship between all the frames is derived, the processing is performed for (N−1) pairs=559 pairs of frames. However, the frame of interest and the next frame do not necessarily need to be continuous and it may also be possible to determine the next frame by thinning frames, such as determining the third frame or the fourth frame as the next frame in a case where the first frame is taken to be the frame of interest.

FIG. 5A to FIG. 5C are diagrams explaining derivation of the correspondence relationship between frames. Here, explanation is given by taking the frame at a certain time t as the frame of interest and the frame at a time (t+1) as the next frame among the input N frames. Further, each three-dimensional model existing in each frame is denoted by M (1), M (2), . . . , M (I). At this time, "I" indicates the total number of three-dimensional models included in each frame. Here, FIG. 5A shows the frame of interest and FIG. 5B shows the next frame and in each frame, three-dimensional models corresponding to three objects (player A, player B, and ball) respectively exist. That is, I=3. Then, M (t, 1) and M (t+1, 1) indicate the three-dimensional model of the player A, M (t, 2) and M (t+1, 2) indicate the three-dimensional model of the ball, and M (t, 3) and M (t+1, 3) indicate the three-dimensional model of the player B respectively, and this correspondence relationship is shown in the table in FIG. 5C. That is, M (t, 1) of the frame of interest corresponds to M (t+1, 1) of the next frame, M (t, 2) of the frame of interest corresponds to M (t+1, 2) of the next frame, and M (t, 3) of the frame of interest corresponds to M (t+1, 3) of the next frame respectively. In this manner, information indicating the correspondence relationship of the three-dimensional models between the frame of interest and the next frame is obtained. In the present embodiment, it is assumed that the same number (I) of three-dimensional models is included in each of the N frames and the number does not change and remains constant.

At S403, the registration unit 203 initializes a variable i (i=1 is set) for identifying one three-dimensional model among the three-dimensional models M (t, 1) to M (t, I) existing in the frame of interest. By this variable i, one three-dimensional model M (t, i) on which attention is focused in the subsequent processing is determined.

Figure 6:
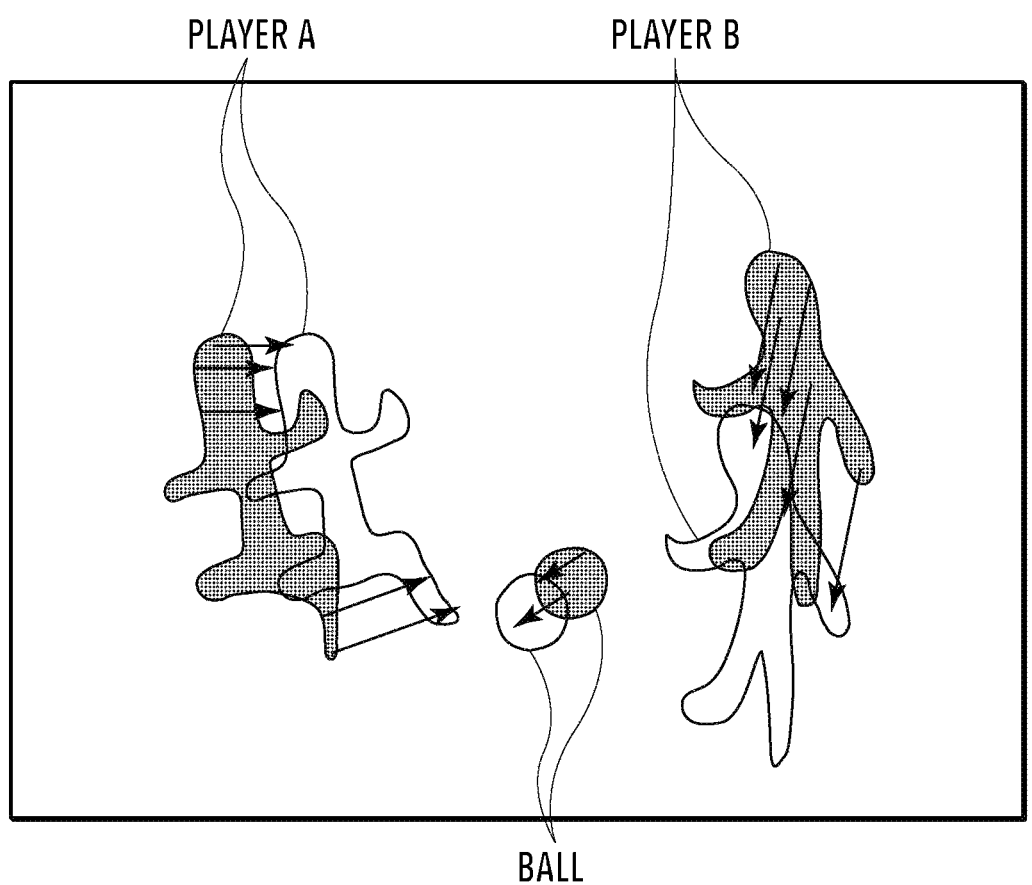
FIG. 6 is an example of results of performing shape registration processing.

At S404, the registration unit 203 performs shape registration processing of the three-dimensional model of interest M (t, i) in the frame of interest and the three-dimensional model of interest M (t+1, i) in the next frame based on the correspondence relationship obtained at S402. In the shape registration processing of the present embodiment, an amount of movement (hereinafter, described as "motion vector") is found, which indicates in which direction and how far the vertex of the mesh representing the three-dimensional model of interest moves while the frame of interest advances to the next frame in terms of time. FIG. 6 shows the results of performing the shape registration processing in the specific example in FIG. 5A to FIG. 5C described previously. In FIG. 6, the shaded portions represent the three-dimensional models of the frame of interest and the unshaded portions represent the three-dimensional models of the next frame. Then, each of a plurality of arrows pointing from the shaded three-dimensional models toward the unshaded three-dimensional models indicates a motion vector for each vertex of the three-dimensional models in the frame of interest. The number of vertexes is larger than shown schematically, but here, the representative vertexes are shown schematically.

In this manner, the motion vector of each vertex possessed by the three-dimensional model of the frame of interest is found by the shape registration. Even though the object shape does not change between frames and is substantially the same, the three-dimensional model is generated each time, and therefore, the positions and the number of vertexes of the mesh are different for different three-dimensional models. For example, in the example in FIG. 6, even though only the leg of the player A moves during a transition from the frame of interest into the next frame, the probability is very faint that the positions and the number of vertexes of the portion that does not move, such as the head and the body, are the same between frames. That is, it is necessary to note that the motion vector of each vertex obtained by the shape registration is not the difference vector of each vertex of the three-dimensional model in the frame of interest and each vertex of the corresponding three-dimensional model in the next frame. In this manner, the motion vector indicating how the vertex coordinates of the three-dimensional model of interest in the frame of interest move in the next frame is output as the results of the shape registration processing.

At S405, whether an unprocessed three-dimensional model exists among the three-dimensional models existing in the frame of interest is determined. In a case where the shape registration processing has been completed for all the three-dimensional models, the processing advances to S407. On the other hand, in a case where there is a three-dimensional model for which the shape registration processing has not been completed yet, the processing advances to S406 and the variable i is incremented (+1) and the next three-dimensional model of interest is determined. Then, after the increment of the variable i, the processing returns to S404 and the same processing is continued by taking the next three-dimensional model of interest as a target.

At S407, whether an unprocessed combination exists for the three-dimensional models corresponding to the input N frames is determined. In a case where derivation of the correspondence relationship and the shape registration processing have been completed for all the combinations, this processing is terminated.

The above is the processing contents of the image processing apparatus 100 according to the present embodiment. The output results of the registration unit 203 are not limited to the motion vector and may be, for example, coordinate information on the vertex after movement. Further, it may also be possible to perform motion analysis processing by using the output motion vector and the vertex coordinates after movement and output the results thereof. For example, it may also be possible to perform an analysis, such as a prediction of the movement (moving direction and speed) of the ball and the player in a specific section (between specific frames) or the movement of the hands and legs of a specific player or further, the future movement of the player and the ball by using the output motion vector, and output the results thereof.

Modification Example

Further, aiming at improvement of the shape accuracy, it is possible to compensate for the defect of a specific three-dimensional model by using the results of the shape registration based on the above-described correspondence relationship. For example, there is a case where a defect occurs in the generation-target three-dimensional model resulting from the orientation and position, the image capturing conditions, the generation method and the like of the object and it is not possible to correctly estimate the object shape by a single frame. Even in such a case, there is a possibility that it has been possible to correctly reproduce the object shape in the corresponding three-dimensional models in the previous and subsequent frames. Consequently, the shape registration is performed with each three-dimensional model in other frames, which corresponds to the three-dimensional model of interest. For example, the shape registration with the three-dimensional model of interest is performed by using the two three-dimensional models corresponding to each other in the previous and subsequent frames of the frame in which the three-dimensional model of interest is included. Due to this, for example, even in a case where a defect exists in the shape of the three-dimensional model of interest, it is possible to compensate for the defect by referring to the shape of the three-dimensional models corresponding to each other in the previous and subsequent frames. As described above, by performing the shape registration with the three-dimensional models in other frames, it is made possible to obtain a three-dimensional model with accuracy higher than that generated independently in each frame.

According to the present embodiment, in a case where shape registration is performed, by using information that specifies a correspondence relationship of three-dimensional models between frames, it is possible to implement shape registration processing with a high accuracy.

Second Embodiment

In the first embodiment, on the premise that the same number of three-dimensional models is included in all the input N frames, the example is explained in which the shape registration is performed by deriving the correspondence relationship of the three-dimensional models between the two target frames. Next, on the premise that the number of three-dimensional models included in each model may change, an aspect is explained as a second embodiment in which a correspondence relationship of three-dimensional models between successive frames is derived and shape registration is performed. Explanation of the contents in common to those of the first embodiment is omitted or simplified and in the following, different points are explained mainly.

Figure 7:
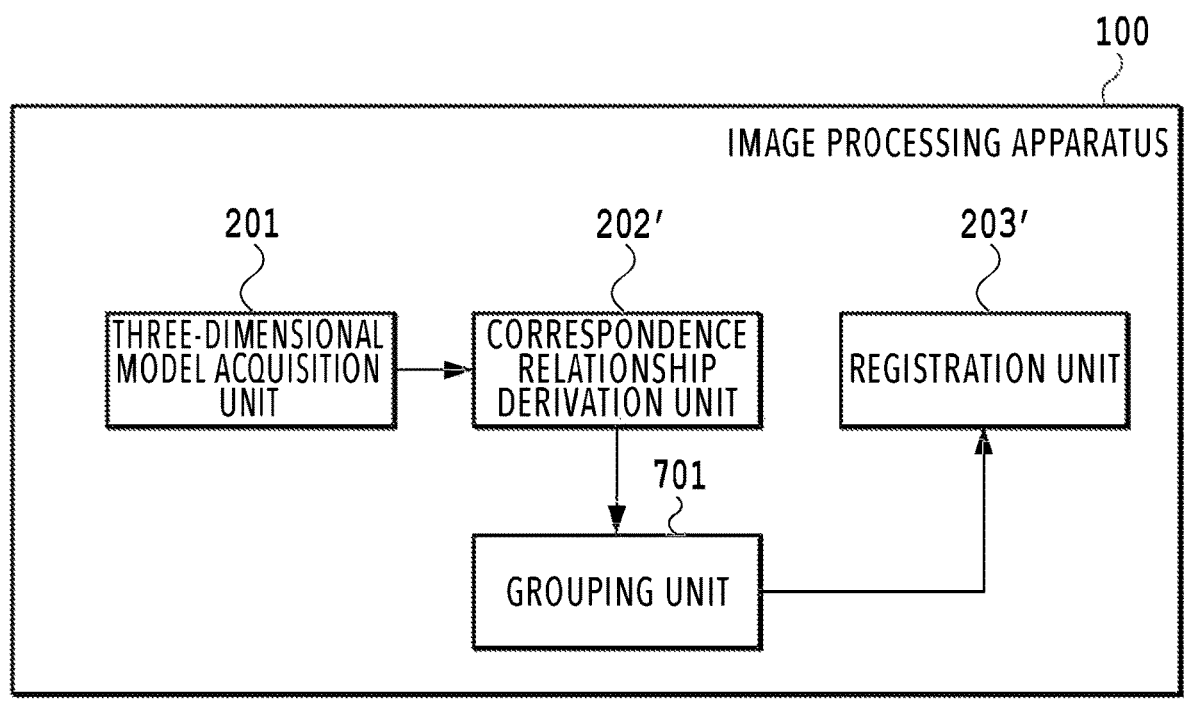
FIG. 7 is a function block diagram showing a software configuration relating to shape registration processing of an image processing apparatus according to a second embodiment.

FIG. 7 is a function block diagram showing a software configuration relating to the shape registration processing of the image processing apparatus 100 according to the present embodiment. A large difference from the first embodiment lies in that a grouping unit 701 is provided. By performing grouping processing of three-dimensional models in the grouping unit 701, it is made possible to perform accurate shape registration even in a case where the number of three-dimensional models changes between frames because combination and separation of three-dimensional models occur.

(Combination and Separation of Three-Dimensional Model)

For example, in a case where an object, such as a player and a ball, exists at a distant position on the field (within target three-dimensional space) in a game, such as soccer, each object is represented as a single three-dimensional model. However, it is unlikely that each individual object exists at a distant position at all times during the game and for example, in a scene in which players scramble for a ball or a scene in which a player is dribbling a ball, the players or the player and ball come close to each other and they contact as the case may be. In the case such as this, the two or more players or the player and the ball are represented together as one three-dimensional model. A case where two or more objects are represented as one three-dimensional model is called "combination of three-dimensional models". Further, a case where the objects located at close positions or at a position at which they touch in a certain frame separate from each other and the one combined three-dimensional model is represented as separate three-dimensional models in the next frame is called "separation of three-dimensional model".

(Details of Correspondence Relationship Derivation Unit)

Figure 8:
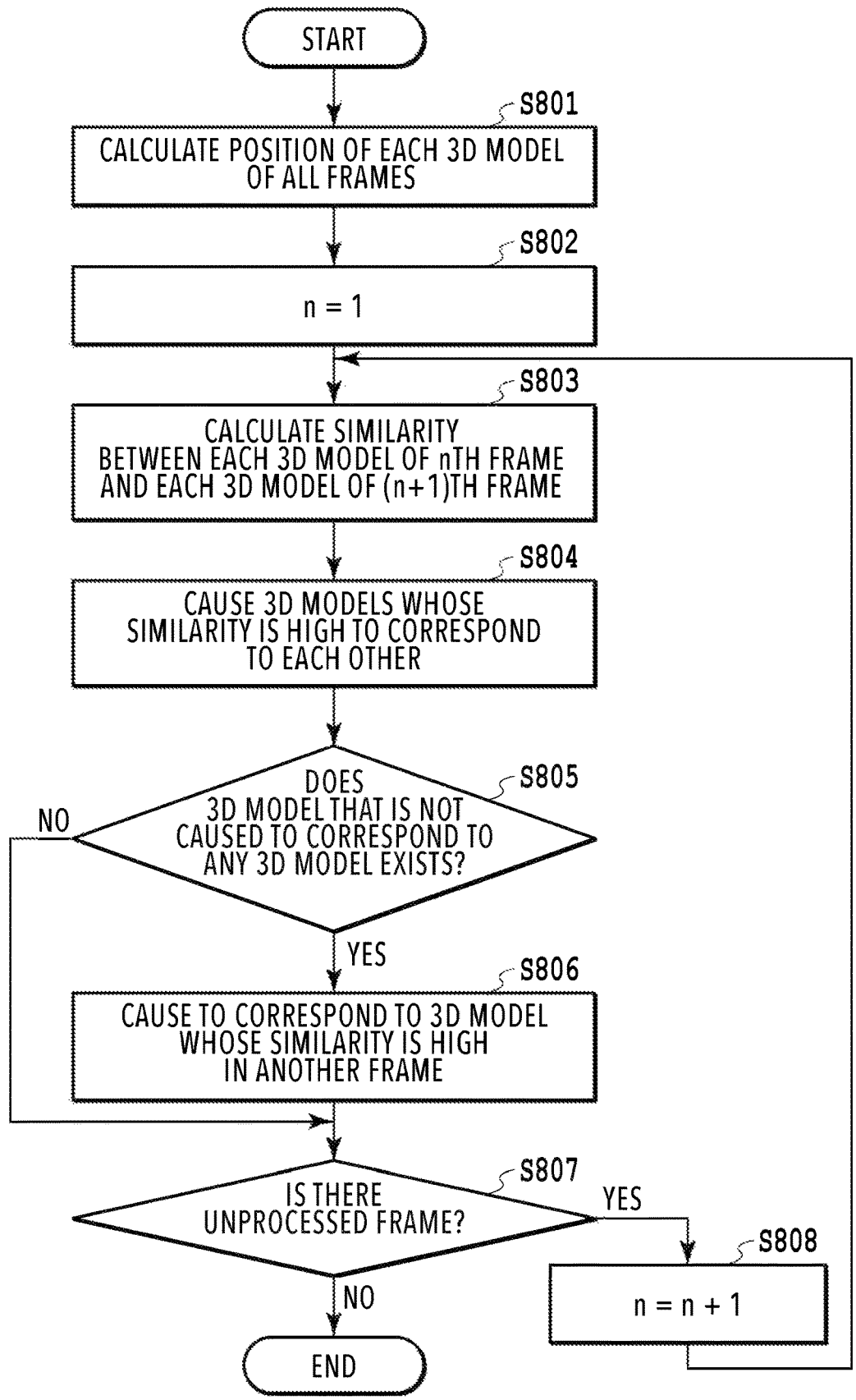
FIG. 8 is a flowchart showing details of object tracking processing.

Before explanation of the grouping unit 701 is given, first, a correspondence relationship derivation unit 202' of the present embodiment is explained. FIG. 8 is a flowchart showing details of object tracking processing performed by the correspondence relationship derivation unit 202' of the present embodiment. In the following, a frame on which attention is focused among the input N frames, which is the processing target, is represented as "nth frame". In this case, "n" is an integer not less than 1 and "N" is an integer not less than 2 and N≥n holds. Further, as described previously, in the present embodiment, the number of three-dimensional models included in each frame may change. Consequently, the number of three-dimensional models included in the nth frame is defined as I (n). Then, the three-dimensional model included in the nth frame, whose number is i, is defined as M (n, i). In this case, "i" is an integer not less than 1 and I≥i holds. In the following explanation, "S" means a step. It is assumed that the number of the three-dimensional model is assigned without duplication.

First, at S801, the data of the three-dimensional models, which correspond to the input N frames, are read from the RAM 202 and a position P (n, i) of a three-dimensional model M (n, i) in each frame is found. As the position P (n, i), mention is made of the centroid position of each three-dimensional model. It is possible to obtain the centroid position by finding the average value of all the vertex coordinates of the mesh configuring the three-dimensional model. The position P (n, i) only needs to be capable of specifying the position of each three-dimensional model and is not limited to the centroid position. After the position P (n, i) of each three-dimensional model M (n, i) corresponding to the N frames is found, the processing advances to S802.

At S802, a variable n indicating the number of the frame of interest is initialized (n=1 is set). Then, at S803 that follows, the similarity between each three-dimensional model existing in the nth frame, which is the frame of interest, and each three-dimensional model existing in the (n+1)th frame is found. In the present embodiment, a distance D between each of the positions P (n, 1) to P (n, I) of each three-dimensional model of the nth frame and each of the positions P (n+1, 1) to P (n+1, I) of each three-dimensional model of the (n+1)th frame is calculated as an index indicating the similarity. For example, in a case where the number of three-dimensional models included in both the frames is three (I=3), the distance between the centroid positions (distance between two points) is found for each of combinations below.

position P (n, 1) and position P (n+1, 1)
position P (n, 1) and position P (n+1, 2)
position P (n, 1) and position P (n+1, 3)
position P (n, 2) and position P (n+1, 1)
position P (n, 2) and position P (n+1, 2)
position P (n, 2) and position P (n+1, 3)
position P (n, 3) and position P (n+1, 1)
position P (n, 3) and position P (n+1, 2)
position P (n, 3) and position P (n+1, 3)

In the present embodiment, it is assumed that the positional relationship on the target three-dimensional space between three-dimensional models is taken as a reference and for a three-dimensional model whose distance from the three-dimensional model of interest is shorter (located at a closer position), it is evaluated that the similarity is higher. The evaluation index of the similarity is not limited to the shortness of the distance between three-dimensional models. For example, by further taking into consideration the shape and size of a three-dimensional model, texture data, the moving direction of an object, and the like as the elements other than the distance, it is possible to obtain a highly accurate similarity.

At S804, based on the similarity calculated at S803, each three-dimensional model included in the nth frame and the three-dimensional model included in the (n+1)th model are caused to correspond to each other. Specifically, processing to cause a three-dimensional model whose similarity is the highest among the three-dimensional models included in one of the frames to correspond to each three-dimensional model included in the other frame is performed. As described above, in a case of the present embodiment in which the shortness of the distance between the centroid positions is used as the similarity, the three-dimensional models whose value of the distance D calculated at S803 is the smallest are caused to correspond to each other. At that time, the same identifier (ID) is assigned to both the three-dimensional models caused to correspond to each other. Any ID may be used as long as the ID is capable of specifying an object and in the present embodiment, an integer value is used. For example, it is assumed that "2" is assigned as ID of the three-dimensional model M (n, 3). Then, in a case where a three-dimensional model M (n+1, 5) in the (n+1)th frame exists at the shortest distance, the same "2" is assigned to the three-dimensional model M (n+1, 5) as ID, and so on.

At S805, whether or not there is a three-dimensional model that is not caused to correspond to any three-dimensional model in one of the nth frame and the (n+1)th frame is determined. This is determined because in a case of the present embodiment in which the number of three-dimensional models included in the nth frame may be different from that in the (n+1)th frame, there is a possibility that no three-dimensional model remains to which a three-dimensional model is caused to correspond in the other frame as a result of causing the three-dimensional models to each other in descending order of the similarity. In a case where there remains a three-dimensional model that is not caused to correspond to any three-dimensional model in one of the frames, the processing advances to S806 and in a case where no such three-dimensional model remains, the processing advances to S807.

At S806, processing to cause a three-dimensional model existing at the position closest to the three-dimensional model itself among the three-dimensional models included in the other frame to correspond to a three-dimensional model that is not caused to correspond to any three-dimensional model is performed.

At S807, whether or not the (n+1)th frame at the current point in time is the last frame of the input N frames is determined. In a case where the determination results indicate that the (n+1)th frame at the current point in time is not the last frame, the processing advances to S808 and the variable n is incremented (+1) and the next frame of interest is determined. Then, after the increment of the variable n, the processing returns to S803 and the same processing is continued by taking the three-dimensional models of the next nth frame and the (n+1)th frame as the target. On the other hand, in a case where the (n+1)th frame at the current point in time is the last frame, this processing is terminated.

The above is the contents of the object tracking processing performed by the correspondence relationship derivation unit 202' according to the present embodiment.

Figure 9:
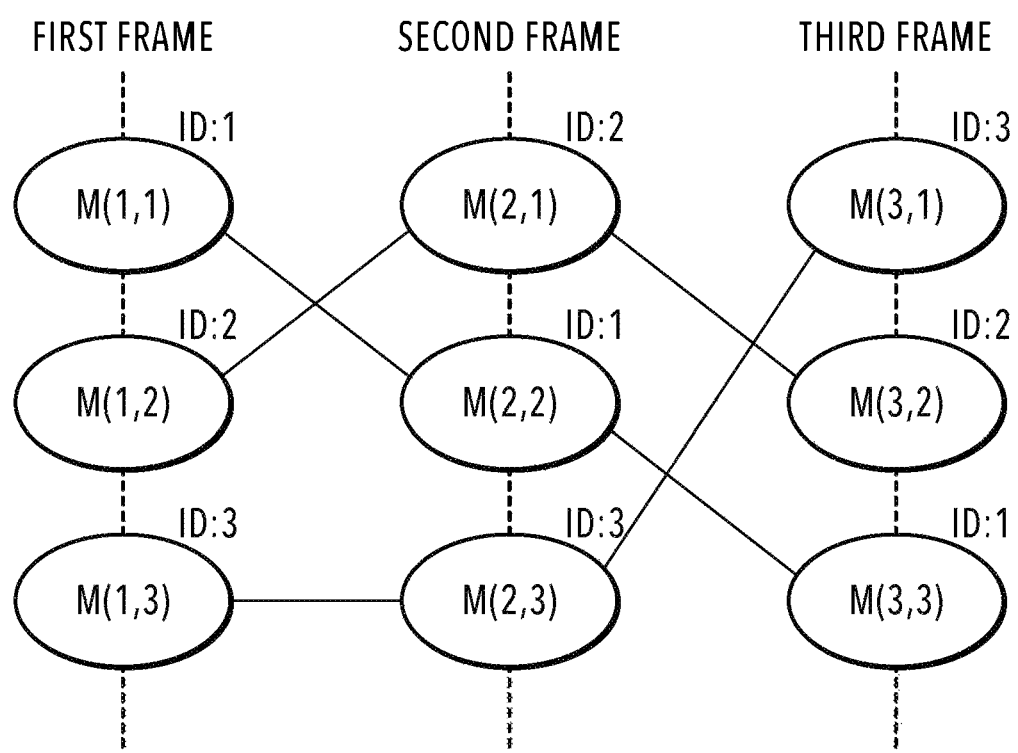
FIG. 9 is a diagram explaining effects of the second embodiment.

In the results of the object tracking of the present embodiment obtained as described above, ID is assigned to each three-dimensional model and the three-dimensional models caused to correspond to each other have the same ID throughout the image capturing scene corresponding to the N frames. The effects obtained by the present embodiment are explained with reference to FIG. 9. FIG. 9 is a diagram schematically showing the results of causing each three-dimensional model to correspond to each other between frames, which is included in each frame, by taking three frames (N=3) as the processing target. Here, in each frame, three three-dimensional models, that is, M (n, 1), M (n, 2), and M (n, 3) exist. Then, in FIG. 10, each line connecting the three-dimensional models indicates the correspondence relationship. For example, it is indicated that the three-dimensional model M (1, 1) of the first frame is caused to correspond to the three-dimensional model M (2, 2) of the second frame and further, M (2, 2) is caused to correspond to the three-dimensional model M (3, 3) of the third frame. In this case, each three-dimensional model of M (1, 1), M (2, 2), and M (3, 3) has the same ID. At this time, it is sufficient to allocate "1 to I (1)" as the value of ID to M (1, 1) to M (1, I) existing in the first frame and assign ID possessed by the corresponding three-dimensional model to the three-dimensional models in the subsequent frames. In the example in FIG. 9, ID=1 is assigned to M (1, 1), M (2, 2), and M (3, 3), ID=2 is assigned to M (1, 2), M (2, 1), and M (3, 2), and ID=3 is assigned to M (1, 3), M (2, 3), and M (3, 1). In the example shown in FIG. 9, one three-dimensional model is caused to correspond to one three-dimensional model without exception. However, as described previously, there is also a case where one three-dimensional model is caused to correspond to two or more three-dimensional models. For example, in a case where one three-dimensional model existing in the nth frame is caused to correspond to a plurality of three-dimensional models in the (n+1)th frame, ID possessed by the three-dimensional model existing in the nth frame is assigned to each of the plurality of three-dimensional models. Similarly, in a case where a plurality of three-dimensional models existing in the nth frame is caused to correspond to one three-dimensional model in the (n+1)th frame, all IDs possessed by each of the plurality of three-dimensional models in the nth frame are assigned to the one three-dimensional model. Further, in a case where a three-dimensional model having a plurality of IDs existing in the nth frame is caused to correspond to a plurality of three-dimensional models in the (n+1)th frame, all of the plurality of IDs possessed by the three-dimensional model existing in the nth frame are assigned to each of the plurality of three-dimensional models. As described above, in the present embodiment, at least one ID that is assigned as a result of object tracking (hereinafter, described as "tracking result ID") is assigned to the three-dimensional model. It is assumed that the tracking result ID that is assigned to each three-dimensional model configures part of data of the three-dimensional model as well as the vertex coordinate information. The way the tracking result ID is possessed is not limited to this and it may also be possible to generate a list describing ID assigned to each three-dimensional model separately from the three-dimensional model.

(Details of Grouping Unit)

Following the above, the grouping unit 701 is explained. For example, in a case where two three-dimensional models independent of each other in a certain frame combines in the next frame and becomes one three-dimensional model, it is not possible to perform shape registration correctly even by making an attempt to fit to the shape of the three-dimensional model after combination from only one of the three-dimensional models. That is, in a case where combination or separation of three-dimensional models occurs, the processing may fail unless shape registration is performed by taking the fact into consideration. Consequently, in the grouping unit 701, processing (grouping processing) to determine combination and separation of three-dimensional models described above based on the correspondence relationship information obtained by the correspondence relationship derivation unit 202' and integrate and group corresponding three-dimensional models into one group is performed. In order to simplify explanation, it is assumed that a new object does not appear or an object does not disappear on the way of an image capturing scene (the objects do not increase or decrease in number throughout N frames).

Figure 10:
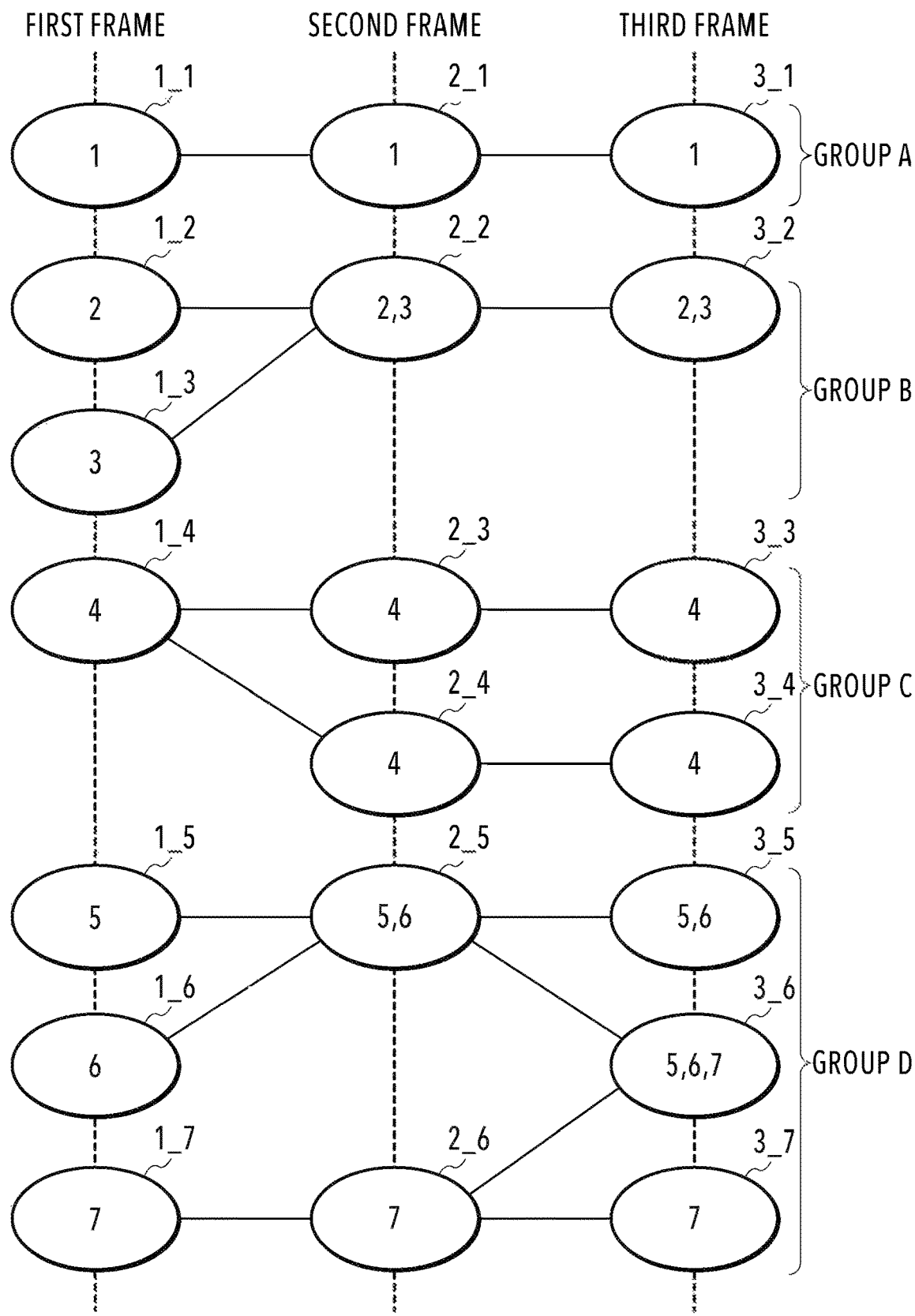
FIG. 10 is a diagram explaining grouping processing.

FIG. 10 is a diagram showing grouping processing in a certain image capturing scene. In FIG. 10, an ellipse indicates a three-dimensional model existing in each frame and the numerical value in the ellipse indicates the tracking result ID possessed by the three-dimensional model. The grouping processing is performed by taking the tracking result ID assigned to the three-dimensional model existing in the last frame as reference. In the example in FIG. 10, the tracking result IDs of three-dimensional models 3_1 to 3_7 of the third frame, which is the last frame of the input N frames (N=3), are the reference at the time of grouping. To each of groups generated by the grouping processing, an ID (here, alphabet) for identifying the group from another group is assigned.

For example, in a case where attention is focused on the three-dimensional model 3_1 (tracking result ID=1) of the third frame, another three-dimensional model having the same ID does not exist in the third frame. Because of this, it is possible to determine that separation and combination of three-dimensional models have not occurred throughout the image capturing scene. In this case, one group (group A) is configured by three three-dimensional models (1_1, 2_1, 3_1) having the same tracking result ID of "1".

Next, in a case where attention is focused on the three-dimensional model 3_2 of the third frame, the three-dimensional model 3_2 has "2" and "3" as the tracking result ID thereof. In this case, it is possible to determine that the three-dimensional model having ID=2 and the three-dimensional model having ID=3 have combined with each other on the way in the image capturing scene. In fact, a three-dimensional model 1_2 and a three-dimensional model 1_3 existing independently of each other in the first frame have combined with each other in the second frame and have become one three-dimensional model 2_2. Then, in the third frame, another three-dimensional model having ID=2 or ID=3 does not exist. Because of this, the four three-dimensional models (1_2, 1_3, 2_2, 2_3) having ID=2 or ID=3 are included in the same group (group B).

Next, in a case where attention is focused on the three-dimensional models 3_3 and 3_4 of the third frame, the tracking result ID is the same and "4". In this case, it is possible to determine that the three-dimensional model having ID=4 has segmented on the way in the image capturing scene. In fact, a three-dimensional model 1_4 that exists solely in the first frame has segmented into two separate three-dimensional models 2_3 and 2_4 in the second frame. Because of this, one group (group C) is configured by the five three-dimensional models (1_4, 2_3, 2_4, 3_3, 3_4) having ID=4.

Next, in a case where attention is focused on the three-dimensional model 3_5 of the third frame, the three-dimensional model 3_5 has "5" and "6" as the tracking result ID thereof. In this case it is possible to determine that the three-dimensional model having ID=5 and the three-dimensional model having ID=6 have combined with each other on the way in the image capturing scene. In fact, a three-dimensional model 1_5 and a three-dimensional model 1_6 existing independently of each other in the first frame have combined with each other in the second frame and become one three-dimensional model 2_5. Then, in the third frame, another three-dimensional model having ID=5 or ID=6 exists, and therefore, it is possible to determine that separation has also occurred on the way in the image capturing scene. In fact, the three-dimensional model 2_5 of the second frame has segmented into the three-dimensional model 3_5 and the three-dimensional model 3_6 in the third frame. Further, the three-dimensional model 3_6 has "7" in addition to "5" and "6" as the tracking result ID thereof. Because of this, it is possible to determine that the three-dimensional model 3_6 has been generated by combination with a three-dimensional model having ID=7. Because of this, one group (group D) is configured by the eight three-dimensional models (1_5, 1_6, 1_7, 2_5, 2_6, 3_5, 3_6, 3_7) having ID=5 to 7.

As described above, in a case of the example in FIG. 10, the three-dimensional models are grouped into the four groups A to D. The grouping method described above is merely exemplary and any method can be used as long as the method is capable of grouping three-dimensional models related with one another into one group for which separation or combination has been performed between frames. Further, it may also be possible to output the results of the grouping processing in any data format as long as which group is configured by which three-dimensional models is known. For example, it may also be possible to generate a list showing ID of three-dimensional models belonging to a group in units of groups, or it may also be possible to assign ID (alphabet or number) of the group, to which the three-dimensional model itself belongs, to each three-dimensional model.

(Details of Registration Unit)

Next, a registration unit 203' of the present embodiment is explained. The registration unit 203' performs shape registration processing in units of groups (units of sets of three-dimensional models), which are the processing results of the grouping unit 701. Specifically, first, the registration unit 203' performs shape registration from the three-dimensional model of interest M (n, i) of the nth frame to the three-dimensional model M (n+1, i) of the (n+1)th frame, which is caused to correspond thereto. Here, it is assumed that approximate shape data of the corresponding three-dimensional model, which are obtained by moving the vertex coordinates of the three-dimensional model of interest, are called "estimated three-dimensional model". Then, the same processing is repeated within the group, such as that shape registration is performed from the obtained estimated three-dimensional model to the three-dimensional model M (n+2, i) of the (n+2)th frame, which is caused to correspond to the three-dimensional model M (n+1, i) of the (n+1)th frame. Here, "i" is a value that may change for each frame and is not necessarily the same value in all the frames. The registration unit 203' outputs, as the processing results thereof, the three-dimensional model (three-dimensional model of interest) that is a reference within the group, and the vertex coordinate information on each estimated three-dimensional model obtained by repeating the shape registration. In a case of the present embodiment, it is sufficient to store the mesh connectivity information on the three-dimensional model that is a reference in each group (it is not necessary to store the mesh connectivity information on all the three-dimensional models belonging to the group). Consequently, it is possible to make an attempt to reduce the amount of data by making common the mesh connectivity information.

Figure 11:
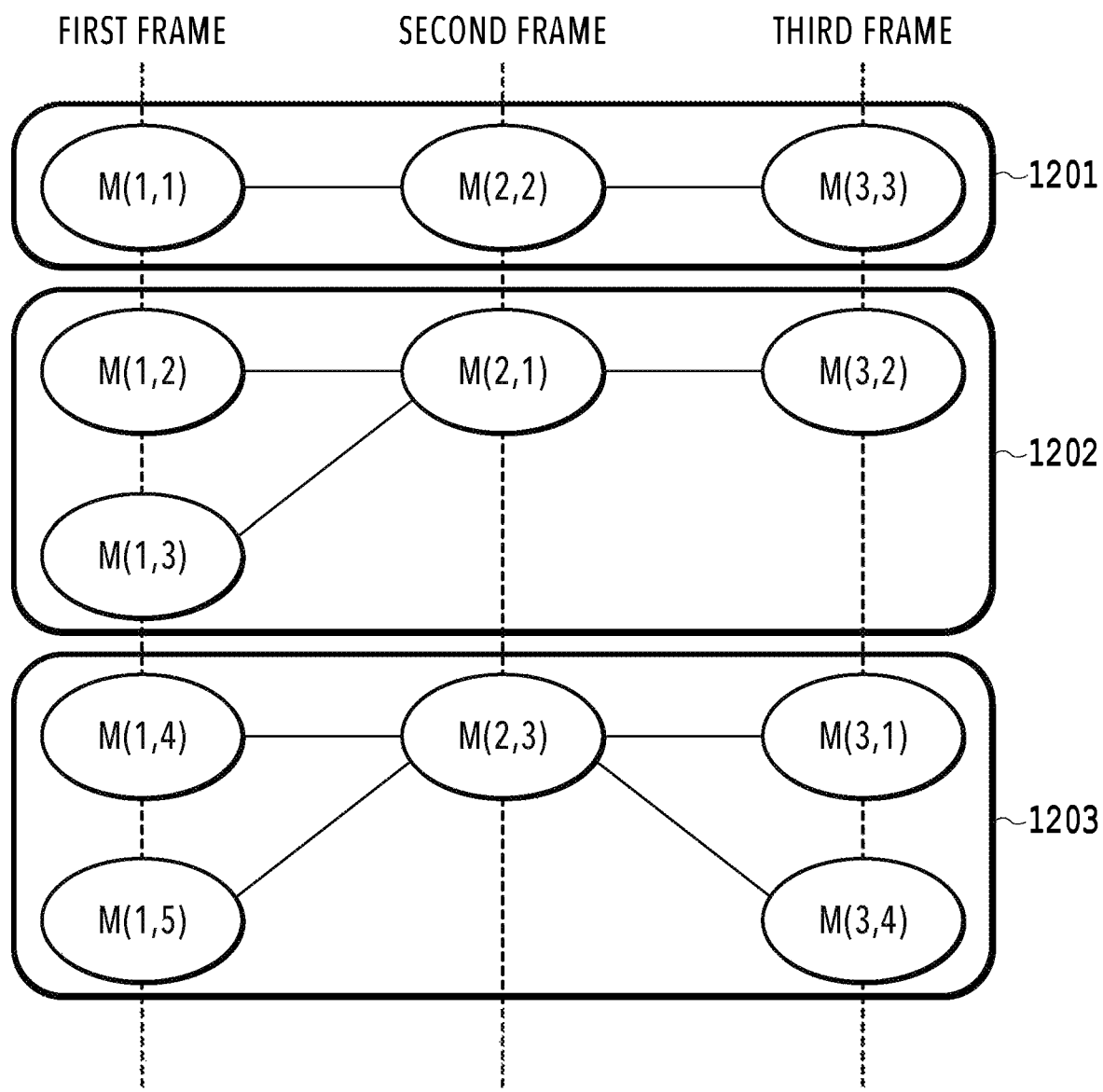
FIG. 11 is a diagram showing an example of results of grouping processing.

FIG. 11 is a diagram showing an example of grouping processing results. By using FIG. 11, shape registration in units of groups according to the present embodiment is explained.

A group indicated by a thick frame 1201 is a group configured by three-dimensional models for which combination or separation has not occurred. In a case of this group 1201, first, shape registration from a three-dimensional model M (1, 1) of the first frame to a three-dimensional model M (2, 2) of the second frame is performed. An estimated three-dimensional model generated by this shape registration is indicated by "M' (n, i)". That is, by the first shape registration, an estimated three-dimensional model M' (2, 2) is generated. Then, the shape registration of the generated estimated three-dimensional model M' (2, 2) and a three-dimensional model M (3, 3) of the third frame is performed and an estimated three-dimensional model M' (3, 3) is generated. In this case, note that the estimated three-dimensional model M' (3, 3) is generated from M' (2, 2), not from M (2, 2). As described above, in a case where there are data (here, vertex information and mesh connectivity information) of the three-dimensional model M (1, 1) of the first frame, it is possible to approximately generate the three-dimensional models M (2, 2) and M (3, 3) of the second frame and the third frame, which belong to the group 1201, by transformation by vertex movement.

A group indicated by a thick frame 1202 is a group in which combination of three-dimensional models has occurred. In a case of this group 1202, first, shape registration from two three-dimensional models M (1, 2) and M (1, 3) of the first frame to one three-dimensional model M (2, 1) of the second frame is performed. Then, shape registration of an estimated three-dimensional model M' (2, 1) obtained by the shape registration and M (3, 2) of the third frame is performed and an estimated three-dimensional model M' (3, 2) is generated. As described above, in a case where there are data of the three-dimensional models M (1, 2) and M (1, 3) of the first frame, it is also possible to approximately generate the three-dimensional models M (2, 1) and M (3, 2) of the second frame and the third frame, which belong to the group 1202, by transformation by vertex movement.

A group indicated by a thick frame 1203 is a group in which combination and separation of three-dimensional models have occurred. In a case of the group 1203, as in the case with the group 1202, shape registration from two three-dimensional models M (1, 4) and M (1, 5) of the first frame to one three-dimensional model M (2, 3) of the second frame is performed. Then, shape registration of an estimated three-dimensional model M' (2, 3) obtained by the shape registration and two three-dimensional models M (3, 1) and M (3, 4) of the third frame is performed and estimated three-dimensional models M' (3, 1) and M' (3, 4) are generated. As described above, in a case where there are data of the three-dimensional models M (1, 4) and M (1, 5) of the first frame, it is possible to approximately generate the three-dimensional models M (2, 3), M (3, 1), and M (3, 4) of the second frame and the third frame, which belong to the group 1203, by transformation by vertex movement.

As above, according to the present embodiment, by performing shape registration that takes the grouping processing results into consideration, it is made possible to correctly perform shape registration even in a case where combination and separation of three-dimensional models occur.

Third Embodiment

Next, an aspect is explained as a third embodiment in which the amount of data of three-dimensional models in a time series is compressed by finding and encoding time differences of the output results from the positioning unit. Explanation of the contents in common to those of the first and second embodiments is omitted or simplified and in the following, different points are explained mainly.

Figure 12:
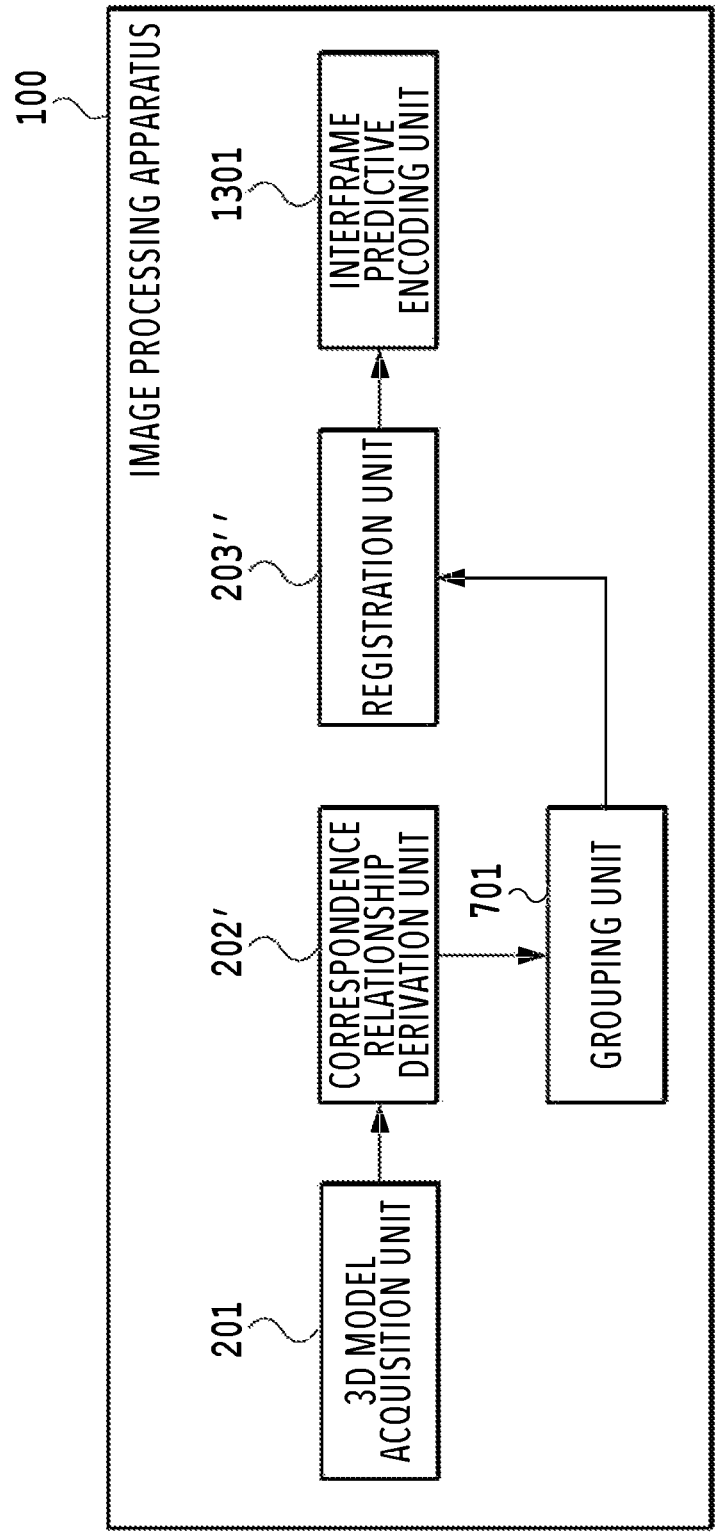
FIG. 12 is a function block diagram showing a software configuration relating to shape registration processing of an image processing apparatus according to a third embodiment.

FIG. 12 is a function block diagram showing the software configuration relating to shape registration processing of the image processing apparatus 100 according to the present embodiment. A large difference from the second embodiment lies in that an interframe predictive encoding unit 1301 is provided. The interframe predictive encoding unit 1301 performs interframe predictive encoding by taking the results of the shape registration processing in a registration unit 203" as an input. In the following, detailed explanation is given.

(Details of Registration Unit)

First, as preprocessing for performing interframe predictive encoding, the registration unit 203" of the present embodiment selects a reference frame at the time of performing shape registration for each group. In the second embodiment, shape registration is performed by taking the first frame in the input N frames as a reference frame, but in the present embodiment, a reference frame is first selected in accordance with the following conditions. In a case where the three-dimensional model existing in the reference frame does not reproduce the shape of an object correctly or the three-dimensional model is in a state where two or more objects contact one another, the accuracy of shape registration is reduced. Consequently, a reduction in accuracy is suppressed by selecting a frame more appropriate as a reference frame.

<Selection Conditions of Reference Frame>

The surface area of a three-dimensional model existing within a frame is larger than that of other frames The shape of a three-dimensional model existing within a frame does not include a ring (hole) (or the number of rings (holes) is smaller than that of other frames)

The number of three-dimensional models existing within a frame is larger than that of other frames To begin with, the first is a condition relating to the surface area of a three-dimensional model. In a case where the surface area of a three-dimensional model is small compared to that of another three-dimensional model representing the same object, there is a possibility that the object shape is not reproduced accurately, such as that the three-dimensional shape representing the object has a defect. Because of this, priority is given to the frame in which a three-dimensional model having a larger surface area exists. The second is a condition relating to the shape represented by a three-dimensional model. In a case where a ring or a hole is included in a three-dimensional model, the possibility that the shape of a portion that should originally be the leading end of the object is hidden is strong. For example, in a three-dimensional model in a state where a person puts his/her hand on his/her waist, a "ring" is formed by the body and the arm. That is, the state is such that the "hand" that is a part of the object is in touch with the "waist" that is another part, and therefore, it is not possible to acquire the shape of the "hand". In a case where the frame including the three-dimensional model such as this is taken as a reference frame, shape registration is performed from the three-dimensional model in a state where a portion that does not touch another portion usually is in touch therewith, and therefore, the shape accuracy is reduced. Because of this, priority is given to the frame in which a three-dimensional model whose shape does not include a ring (hole) exists. Further, the third is a condition relating to the number of three-dimensional models. In a case where the number of three-dimensional models existing in the frame is small, there is a possibility that two or more objects are in contact with one another and those are represented by one three-dimensional model. Because of this, priority is given to the frame in which the number of existing three-dimensional models is large. In view of these three conditions, a frame the most appropriate as a reference frame is selected and by performing shape registration with a three-dimensional model existing in the frame as a reference, it is possible to obtain an estimated three-dimensional model with a higher accuracy.

Figure 13:
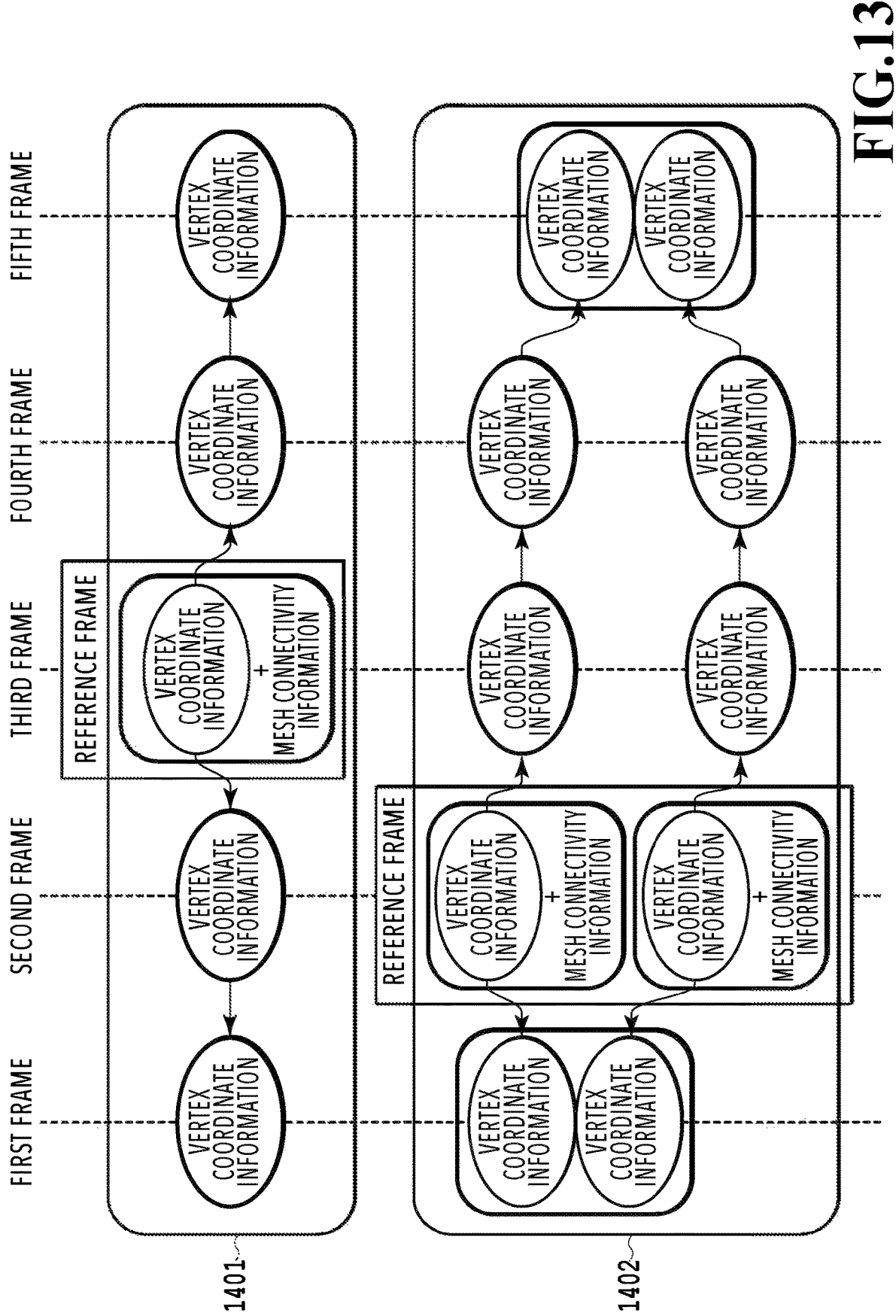
FIG. 13 is a diagram schematically showing an example of results of shape registration.

FIG. 13 is a diagram schematically showing an example of shape registration results in the present embodiment. In the example in FIG. 13, the processing-target scene is configured by five frames (N=5). In each frame, two three-dimensional models (first frame and fifth frame) or three three-dimensional models (second to fourth frames), which are indicated by thick frames, are included and those three-dimensional models are grouped into two groups 1401 and 1402. Then, in each of the groups 1401 and 1402, based on the above-described three conditions, the third frame and the second frame are selected as the reference frame, respectively. In this case, the registration unit 203" performs shape registration by taking a three-dimensional model existing in the third frame as the reference for the group 1401. As a result of that, as shown in the upper section in FIG. 13, for the three-dimensional models other than the three-dimensional model of the third frame, which is the reference, an estimated three-dimensional model not having mesh connectivity information is generated. Similarly, in the group 1402 also, as a result of shape registration, for the three-dimensional models other than the two three-dimensional models of the second frame, which are the reference, an estimated three-dimensional model having vertex coordinate information but not having mesh connectivity information is generated. Then, the registration unit 203" outputs both the vertex coordinate information and the mesh connectivity information for the three-dimensional model existing in the reference frame and outputs only the vertex coordinate information for the estimated three-dimensional model existing in the frame that is not the reference frame.

(Details of Interframe Predictive Encoding Unit)

Figure 14A:
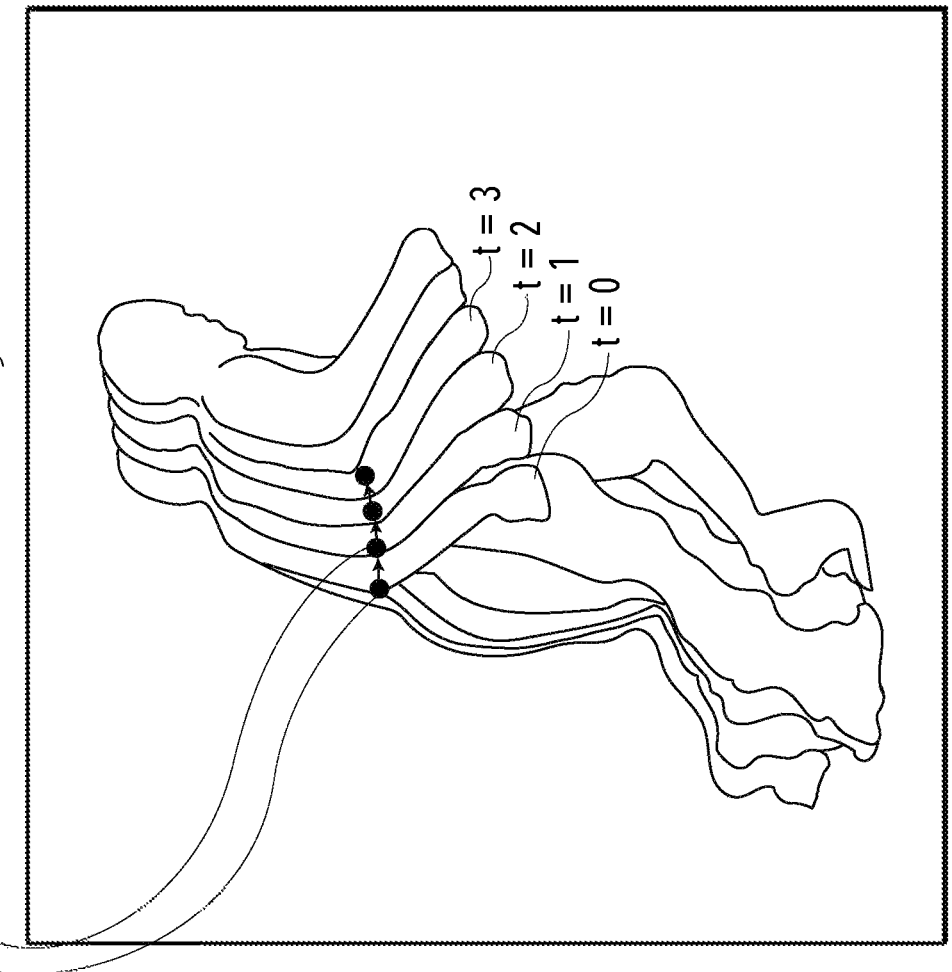
FIG. 14A and FIG. 14B are conceptual diagrams explaining a difference value of vertex coordinates.
Figure 14B:
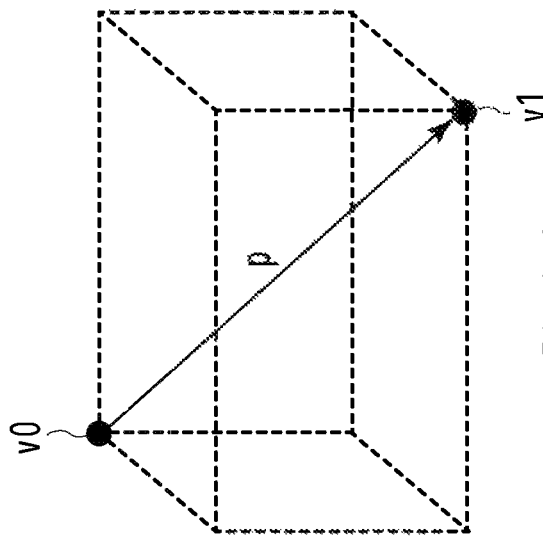

The interframe predictive encoding unit 1301 performs interframe predictive encoding processing by using the results of the shape registration for each group, which are obtained by the registration unit 203". Specifically, for each group, the difference value of the vertex coordinates between the three-dimensional models corresponding to each other is calculated in order from the first frame and processing to quantize and encode the obtained difference value is performed. FIG. 14A and FIG. 14B are conceptual diagrams explaining the difference value of the vertex coordinates. In FIG. 14A, three-dimensional models of a person corresponding to four frames, that is, t=0 to 3, exist. Then, the vertex coordinates in the vicinity of the right elbow in each three-dimensional model are indicated by a black circle and the elapse of time is indicated by arrows. As shown in FIG. 14A, a difference value p between vertex coordinates V0 of the black circle in the frame at t=0 and vertex coordinates V1 of the black circle in the frame at t=1 is p=V0−V1. FIG. 14B is a diagram representing the difference value p three-dimensionally. The difference value p may be represented in any data format, such as that the difference value p is represented by a vector having two components: direction and distance.

Figure 15:
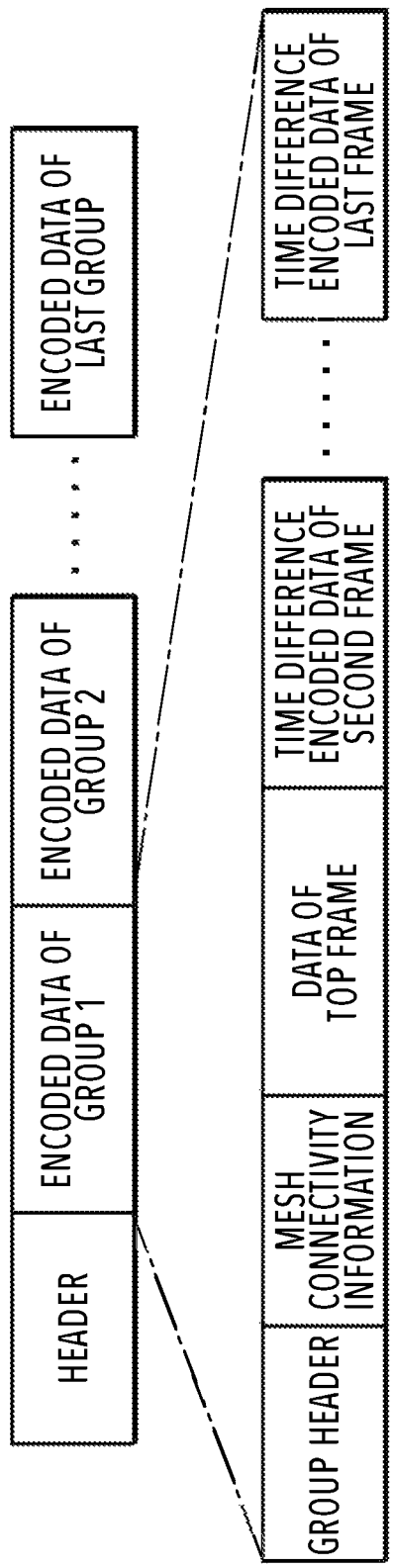
FIG. 15 is a diagram explaining a data structure of a code stream.

FIG. 15 is a diagram explaining the data structure of a code stream that is output as the results of the interframe predictive encoding processing. To the top of the code stream, header information necessary for decoding the encoded data, for example, information such as the number of frames and the number of groups is added. The header information is followed by the encoded data for each group. Then, the encoded data for each group are segmented as follows. First, at the top, group header information exits, such as information on the reference frame or the like, which is necessary for decoding a three-dimensional model configuring the group. Then, the mesh connectivity information that is made common within the group follows and further, the vertex coordinate information on the three-dimensional model existing in the top frame and the time difference encoded data in the second frame to the last frame follow in this order. The data structure of the code stream shown in FIG. 15 is an example and the data structure may have any format as long as it is possible to decode the three-dimensional model in each frame configuring the image capturing scene. Further, as the method of encoding, any method may be used as long as the encoding is the entropy encoding, such as the Golomb encoding. Furthermore, in the present embodiment, the example is explained in which the difference value is calculated in order by taking the vertex coordinates of the three-dimensional model included in the top frame as the reference and the time difference coding is performed, but the method of encoding is not limited to this. For example, it may also be possible to change the start position of encoding, such as that the vertex coordinates of the center frame or the last frame are taken as the reference, or perform inter-frame prediction using a frame set called GOP (Group of Pictures). Further, in the present embodiment, the mesh connectivity information and the vertex coordinate information on the three-dimensional model existing in the top frame are excluded from the target of encoding, but these may be included in the target of encoding.

As above, according to the present embodiment, by performing the interframe predictive encoding processing using the results of the shape registration for each group, it is made possible to make both a reduction in the amount of data and accurate shape reproduction coexist.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is made possible to perform shape registration processing with a high accuracy.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-029156, filed Feb. 21, 2019 which is hereby incorporated by reference wherein in its entirety.

What is claimed is:

1. An image processing apparatus comprising:
    an acquisition unit configured to acquire data, which correspond to N frames (N is an integer not less than 2), in units of frames including a plurality of three-dimensional models;
    a processing unit configured to perform shape registration processing for the three-dimensional models, which correspond to the N frames, acquired by the acquisition unit, the shape registration processing being performed, based on information indicating a correspondence relationship of the three-dimensional models between frames of the N frames, for the three-dimensional models caused to correspond to each other between the frames; and
    an encoding unit configured to perform interframe predictive encoding for the three-dimensional models, which correspond to the N frames, acquired by the acquisition unit based on results of the shape registration processing in the processing unit, wherein the encoding unit calculates a difference value of vertex coordinates between corresponding three-dimensional models in order from a top frame of the N frames and encodes the calculated difference value.

2. The image processing apparatus according to claim 1, wherein the information indicating the correspondence relationship is information indicating that, in a case where two or more objects are represented by three-dimensional models, which are independent of one another in a first frame of the N frames and the two or more objects are represented by one three-dimensional model in a second frame that advances from the first frame in terms of time, the two or more three-dimensional models, which are independent of one another, in the first frame combined to become the one three-dimensional model in the second frame.

3. The image processing apparatus according to claim 1, wherein the information indicating the correspondence relationship is information indicating that, in a case where two or more objects are represented by one three-dimensional model in a first frame of the N frames and the two or more objects are represented by three-dimensional models, which are independent of one another, in a second frame that advances from the first frame in terms of time, the one three-dimensional model in the first frame is separated into the two or more three-dimensional models, which are independent of one another, in the second frame.

4. The image processing apparatus according to claim 1, further comprising:

a derivation unit configured to derive the information indicating the correspondence relationship based on the three-dimensional models, which correspond to the N frames, acquired by the acquisition unit, wherein the processing unit performs the shape registration processing based on the information indicating the correspondence relationship derived by the derivation unit.

5. The image processing apparatus according to claim 4, wherein the derivation unit derives, for the three-dimensional models corresponding to the N frames, the information indicating the correspondence relationship based on at least one of a distance in a three-dimensional space, a shape or a size represented by the three-dimensional models, texture data, and an object moving direction.

6. The image processing apparatus according to claim 1, wherein the acquisition unit further acquires the information indicating the correspondence relationship.

7. The image processing apparatus according to claim 1, wherein the processing unit is further configured to perform the shape registration processing for a three-dimensional model of interest among the three-dimensional models, which correspond to the N frames, acquired by the acquisition unit based on results of the shape registration processing in the processing unit.

8. The image processing apparatus according to claim 1, wherein the processing unit is further configured to perform motion analysis processing for a three-dimensional model of interest among the three-dimensional models, which correspond to the N frames, acquired by the acquisition unit based on results of the shape registration processing in the processing unit.

9. The image processing apparatus according to claim 1, further comprising:

a grouping unit configured to group, in a case where there are a frame including one three-dimensional model representing two or more objects and a frame including two or more three-dimensional models segmented from the one three-dimensional model in the N frames, three-dimensional models corresponding to each other between frames into one group, wherein the processing unit performs the shape registration processing in units of sets of three-dimensional models grouped into the one group.

10. The image processing apparatus according to claim 9, wherein

The processing unit selects a reference frame for each of groups and performs the shape registration processing by taking a three-dimensional model existing in the reference frame as a reference.

11. The image processing apparatus according to claim 10, wherein the processing unit selects the reference frame in accordance with at least one condition of a surface area of a three-dimensional model existing within a frame, a shape of a three-dimensional model existing within a frame, and a number of three-dimensional models existing within a frame.

12. An image processing method comprising:

acquiring data, which correspond to N frames (N is an integer not less than 2), in units of frames including a plurality of three-dimensional models;

performing shape registration processing for the three-dimensional models corresponding to the acquired N frames; and performing interframe predictive encoding for the three-dimensional models, which correspond to the acquired N frames, based on results of the shape registration processing, wherein the shape registration processing is performed, based on information indicating a correspondence relationship of the three-dimensional models between frames of the acquired N frames, for the three-dimensional models caused to correspond to each other between the frames, and a difference value of vertex coordinates between corresponding three-dimensional models in order from a top frame of the acquired N frames is calculated and the calculated difference value is encoded.

13. A non-transitory computer readable storage medium storing a program for causing a computer to perform an image processing method comprising the steps of:

acquiring data, which correspond to N frames (N is an integer not less than 2), in units of frames including a plurality of three-dimensional models;

performing shape registration processing for the three-dimensional models corresponding to the acquired N frames; and performing interframe predictive encoding for the three-dimensional models, which correspond to the acquired N frames, based on results of the shape registration processing, wherein the shape registration processing is performed, based on information indicating a correspondence relationship of the three-dimensional models between frames of the acquired N frames, for the three-dimensional models caused to correspond to each other between the frames, and a difference value of vertex coordinates between corresponding three-dimensional models in order from a top frame of the acquired N frames is calculated and the calculated difference value is encoded.

\* \* \* \* \*